(12) United States Patent
Mori et al.

(10) Patent No.: US 8,939,570 B2
(45) Date of Patent: Jan. 27, 2015

(54) INK JET INK, INK CARTRIDGE, INK JET RECORDING METHOD AND POLYMER PARTICLE

(71) Applicant: Canon Kabushiki Kaisha, Tokyo (JP)

(72) Inventors: Takahiro Mori, Inagi (JP); Satoru Kobayashi, Yokohama (JP); Shinichi Sakurada, Tokyo (JP); Yutaka Kurabayashi, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/665,278

(22) Filed: Oct. 31, 2012

(65) Prior Publication Data

US 2013/0141498 A1 Jun. 6, 2013

(30) Foreign Application Priority Data

Dec. 2, 2011 (JP) ................................. 2011-264877

(51) Int. Cl.
| | |
|---|---|
| *C09D 11/10* | (2014.01) |
| *C09D 11/38* | (2014.01) |
| *C09D 11/40* | (2014.01) |
| *B41J 2/21* | (2006.01) |
| *B41J 2/175* | (2006.01) |

(52) U.S. Cl.
CPC ................ *C09D 11/38* (2013.01); *C09D 11/10* (2013.01); *C09D 11/40* (2013.01); *B41J 2/2107* (2013.01); *B41J 2/17503* (2013.01)
USPC .................. 347/100; 347/95; 347/96; 347/86

(58) Field of Classification Search
CPC ........ B41J 2/01; B41J 2/2107; B41J 2/17503; C09D 11/30; C09D 11/10; C09D 11/40; C09D 11/54; C09D 11/106
USPC ...................... 347/95–100, 86; 523/160, 161; 106/31.13, 31.6
See application file for complete search history.

(56) References Cited

U.S. PATENT DOCUMENTS

| | | |
|---|---|---|
| 4,954,395 A | 9/1990 | Hasegawa et al. |
| 5,027,131 A | 6/1991 | Hasegawa et al. |
| 5,059,983 A | 10/1991 | Higuma et al. |
| 5,081,470 A | 1/1992 | Kurabayashi et al. |
| 5,120,601 A | 6/1992 | Kotaki et al. |
| 5,124,201 A | 6/1992 | Kurabayashi et al. |
| 5,137,778 A | 8/1992 | Nakatsugawa et al. |
| 5,139,868 A | 8/1992 | Mori et al. |
| 5,140,339 A | 8/1992 | Higuma et al. |
| 5,171,626 A | 12/1992 | Nagamine et al. |
| 5,246,774 A | 9/1993 | Sakaki et al. |
| 5,271,989 A | 12/1993 | Mori et al. |
| 5,277,962 A | 1/1994 | Nakatsugawa et al. |
| 5,314,713 A | 5/1994 | Mori et al. |
| 5,362,558 A | 11/1994 | Sakaki et al. |
| 5,415,686 A | 5/1995 | Kurabayashi et al. |
| 5,439,515 A | 8/1995 | Kurabayashi et al. |
| 5,526,031 A | 6/1996 | Kurabayashi |
| 5,549,740 A | 8/1996 | Takahashi et al. |
| 5,614,007 A | 3/1997 | Kurabayashi et al. |
| 5,618,338 A | 4/1997 | Kurabayashi et al. |
| 5,623,294 A | 4/1997 | Takizawa et al. |
| 5,624,484 A | 4/1997 | Takahashi et al. |
| 5,651,814 A | 7/1997 | Shimomura et al. |
| 5,700,314 A | 12/1997 | Kurbayashi et al. |
| 5,734,403 A | 3/1998 | Suga et al. |
| 5,792,249 A | 8/1998 | Shirota et al. |
| 5,835,116 A | 11/1998 | Sato et al. |
| 5,849,815 A | 12/1998 | Aoki et al. |
| 5,985,975 A | 11/1999 | Kurabayashi et al. |
| 6,027,210 A | 2/2000 | Kurabayashi et al. |
| 6,238,045 B1 | 5/2001 | Ono et al. |
| 6,322,209 B1 | 11/2001 | Sato et al. |
| 6,341,855 B1 | 1/2002 | Kurabayashi |
| 6,342,096 B1 | 1/2002 | Kurabayashi |
| 6,367,921 B1 | 4/2002 | Kurabayashi et al. |
| 6,398,355 B1 | 6/2002 | Shirota et al. |
| 6,399,674 B1 | 6/2002 | Kashiwazaki et al. |
| 6,412,936 B1 | 7/2002 | Mafune et al. |
| 6,460,989 B1 | 10/2002 | Yano et al. |
| 6,471,757 B1 | 10/2002 | Koitabashi et al. |
| 6,517,199 B1 | 2/2003 | Tomioka et al. |
| 6,521,323 B1 | 2/2003 | Sakaki et al. |
| 6,536,890 B1 | 3/2003 | Kato et al. |
| 6,719,420 B2 | 4/2004 | Tomioka et al. |
| 6,746,114 B2 | 6/2004 | Takahashi et al. |
| 6,780,901 B1 | 8/2004 | Endo et al. |
| 6,790,878 B2 | 9/2004 | Kurabayashi |
| 6,794,427 B2 | 9/2004 | Kurabayashi et al. |
| 6,821,328 B2 | 11/2004 | Tomioka et al. |
| 6,966,944 B2 | 11/2005 | Shimomura et al. |
| 7,198,837 B1 | 4/2007 | Endo et al. |
| 7,208,032 B2 | 4/2007 | Hakamada et al. |
| 7,285,310 B2 | 10/2007 | Kanke et al. |
| 7,297,194 B2 | 11/2007 | Shinjo et al. |
| 7,503,649 B2 | 3/2009 | Kishi et al. |
| 7,517,073 B2 | 4/2009 | Nito et al. |
| 7,517,074 B2 | 4/2009 | Hakamada et al. |
| 7,976,148 B2 | 7/2011 | Kishi et al. |
| 8,282,725 B2 | 10/2012 | Shimomura et al. |
| 2011/0001775 A1 | 1/2011 | Nishiwaki et al. |
| 2011/0104453 A1 | 5/2011 | Shinjo et al. |
| 2011/0261129 A1 | 10/2011 | Harada et al. |
| 2012/0050386 A1* | 3/2012 | Shimizu et al. ................. 347/20 |

* cited by examiner

FOREIGN PATENT DOCUMENTS

| | | |
|---|---|---|
| JP | 9-267034 A | 10/1997 |
| JP | 2011-011449 A | 1/2011 |
| JP | 2011-026553 A | 2/2011 |

*Primary Examiner* — Matthew Luu
*Assistant Examiner* — Rut Patel
(74) *Attorney, Agent, or Firm* — Fitzpatrick, Cella, Harper & Scinto

(57) ABSTRACT

An ink jet ink containing a coloring material and a polymer particle, wherein the polymer particle has a core portion and a shell portion, the shell portion contains a copolymer A having a unit derived from a compound (a1) represented by a general formula (1) of $R_1—(C_2H_4O)_n—R_2$ where $R_1$ is at least one selected from a vinyl group, an allyl group, an acryloyl group and a methacryloyl group, $R_2$ is a hydrogen atom or an alkyl group, and n is 30-100, and a unit derived from an $\alpha,\beta$-unsaturated hydrophobic compound (a2), a proportion of the unit derived from the compound (a1) to the copolymer A is 50-90% by mass or less, a proportion of the unit derived from the compound (a2) to the copolymer A is 10-50% by mass or less, and the core portion contains a polymer of an $\alpha,\beta$-unsaturated hydrophobic compound (b).

9 Claims, No Drawings

INK JET INK, INK CARTRIDGE, INK JET RECORDING METHOD AND POLYMER PARTICLE

BACKGROUND OF THE INVENTION

1. Field of the Invention

The present invention relates to an ink jet ink, and an ink cartridge and an ink jet recording method using such an ink, and a polymer particle used in such an ink.

2. Description of the Related Art

An ink containing a polymer particle has been investigated for the purpose of improving fastness properties of an image. Emulsion polymerization in water is general as a process for synthesizing the polymer particle. Upon emulsion polymerization, it is necessary to use an emulsifier for stably dispersing (emulsifying) a hydrophobic monomer in water. A surfactant is generally used as the emulsifier. The surfactant works for incorporating the hydrophobic monomer in a micelle formed to stably disperse the monomer in water. Upon emulsion polymerization, the surfactant is used in an amount more than a critical micelle concentration for always stably retaining emulsion in a polymerization system. Therefore, a surfactant contributing to no polymerization and a surfactant separated from the polymer particle obtained by the emulsion polymerization are present to no small extent in an ink containing the polymer particle obtained by the emulsion polymerization. When the surfactant remains in the ink in such a manner, a phenomenon that a bubble generated in a liquid becomes hard to disappear (a phenomenon that defoaming properties are lowered) occurs. This is considered to be caused by the remaining surfactant. When such an ink low in defoaming properties is ejected from a recording head of an ink jet system, the viscosity of the ink is increased by the influence of a bubble generated in the ink to lower the ejection stability of the ink.

In order to improve the defoaming properties of an ink, a polymer particle obtained by emulsion polymerization using a surfactant high in defoaming properties has thus been investigated (Japanese Patent Application Laid-Open No. H09-267034). Japanese Patent Application Laid-Open No. H09-267034 discloses that a polymer particles improved in defoaming properties is obtained by emulsion polymerization using a specific nonionic polymer surfactant as the surfactant high in defoaming properties.

On the other hand, a polymer particle of a core-shell structure is used in a field of an ink jet ink (Japanese Patent Application Laid-Open No. 2011-026553 and Japanese Patent Application Laid-Open No. 2011-011449). Japanese Patent Application Laid-Open No. 2011-026553 and Japanese Patent Application Laid-Open No. 2011-011449 describe an ink containing a polymer particle of a core-shell structure in which a core is formed of a hydrophobic polymer, and a shell is formed of a polymer having an ionic hydrophilic group.

SUMMARY OF THE INVENTION

However, the defoaming properties of the ink containing the polymer described in Japanese Patent Application Laid-Open No. H09-267034 were high, but the ejection stability of the ink was low when the ink was ejected from a recording head of an ink jet system. When the polymer particle described in Japanese Patent Application Laid-Open No. 2011-026553 and Japanese Patent Application Laid-Open No. 2011-011449 was used in the ink, the fastness properties (particularly, water resistance) of the resulting image was low because the ionic hydrophilic group was present.

Accordingly, it is an object of the present invention to provide an ink jet ink that is high in ejection stability and provides an image high in water resistance. Another object of the present invention is to provide an ink cartridge and an ink jet recording method using the ink according to the present invention. A further object of the present invention is to provide a polymer particle that can provide an ink jet ink which is high in ejection stability when the particle is used in the ink and provides an image high in water resistance. The above objects can be achieved by the present invention described below. According to the present invention, there is provided an ink jet ink comprising a coloring material and a polymer particle, wherein the polymer particle has a core portion and a shell portion, the shell portion contains a copolymer A having a unit derived from a compound (a1) represented by a general formula (1) of $R_1$—$(C_2H_4O)_n$—$R_2$ where $R_1$ is at least one selected from a vinyl group, an allyl group, an acryloyl group and a methacryloyl group, $R_2$ is a hydrogen atom or an alkyl group, and n is 30 or more and 100 or less, and a unit derived from an $\alpha,\beta$-unsaturated hydrophobic compound (a2), a proportion of the unit derived from the compound (a1) to the copolymer A is 50% by mass or more and 90% by mass or less, a proportion of the unit derived from the compound (a2) to the copolymer A is 10% by mass or more and 50% by mass or less, and the core portion contains a polymer of an $\alpha,\beta$-unsaturated hydrophobic compound (b).

According to the present invention, there is also provided an ink cartridge comprising an ink storage portion storing an ink, wherein the ink stored in the ink storage portion is the ink jet ink described above.

According to the present invention, there is further provided an ink jet recording method comprising ejecting an ink by an ink jet system, wherein the ink is the ink jet ink described above.

According to the present invention, there is still further provided a polymer particle used in an ink jet ink, wherein the polymer particle has a core portion and a shell portion, the shell portion contains a copolymer A having a unit derived from a compound (a1) represented by a general formula (1) of $R_1$—$(C_2H_4O)_n$—$R_2$ where $R_1$ is at least one selected from a vinyl group, an allyl group, an acryloyl group and a methacryloyl group, $R_2$ is a hydrogen atom or an alkyl group, and n is 30 or more and 100 or less, and a unit derived from an $\alpha,\beta$-unsaturated hydrophobic compound (a2), a proportion of the unit derived from the compound (a1) to the copolymer A is 50% by mass or more and 90% by mass or less, a proportion of the unit derived from the compound (a2) to the copolymer A is 10% by mass or more and 50% by mass or less, and the core portion contains a polymer of an $\alpha,\beta$-unsaturated hydrophobic compound (b).

According to the present invention, there can be provided an ink jet ink that is high in ejection stability and provides an image high in water resistance. According to another embodiment of the present invention, there can be provided an ink cartridge and an ink jet recording method using the ink. A further embodiment of the present invention, there can be provided a polymer particle that can provide an ink jet ink which is high in ejection stability when the particle is used in the ink and provides an image high in water resistance.

Further features of the present invention will become apparent from the following description of exemplary embodiments.

DESCRIPTION OF THE EMBODIMENTS

Preferred embodiments of the present invention will now be described in detail. Incidentally, "(meth)acrylic acid" and "(meth)acrylate" hereinafter mean "acrylic acid" and "methacrylic acid", as well as "acrylate" and "methacrylate", respectively.

The present inventors have investigated the cause of the lowered ejection stability of the ink containing the polymer particle synthesized by using the polymer surfactant as described in Japanese Patent Application Laid-Open No. H09-267034. As a result, it has been found that the cause is that a polymer surfactant remaining without contributing to polymerization and a polymer surfactant separated from the polymer particle adhere to a face of a recording head (a face having an ejection orifice for ejecting the ink). Incidentally, this adhesion phenomenon of the polymer surfactant has occurred not only in a thermal ink jet system, but also in an ink jet system utilizing a piezo element. From the above, it has been found that the method using the polymer surfactant high in the defoaming properties improves the lowering of the ejection stability by the low defoaming properties, whereas the ejection stability of the ink is yet low due to a new problem derived from the polymer surfactant.

As described above, the cause of the lowered ejection stability of the ink in any of the ink using the polymer particle obtained by the conventional emulsion polymerization process using the surfactant and the ink using the polymer particle (Japanese Patent Application Laid-Open No. H09-267034) obtained by the emulsion polymerization process using the polymer surfactant has been that the surfactant remains in the polymer particle. Therefore, the present inventors have investigated a process for synthesizing a polymer particle without using a surfactant, thus leading to completion of the present invention.

The present inventors have carried out various investigations. As a result, it has been found that a polymer particle can be synthesized without using a surfactant by preliminarily synthesizing a specific copolymer acting like an emulsifier upon polymerization and then adding a hydrophobic compound high in compatibility with the copolymer to conduct polymerization.

In the present invention, the copolymer acting like an emulsifier upon the polymerization is a copolymer (hereinafter, also referred to as "a copolymer A" in the present invention) having at least a unit derived from a compound (a1) represented by a general formula (1): $R_1$—$(C_2H_4O)_n$—$R_2$, wherein $R_1$ is at least one selected from a vinyl group, an allyl group, an acryloyl group and a methacryloyl group, $R_2$ is a hydrogen atom or an alkyl group, and n is 30 or more and 100 or less, and a unit derived from an $\alpha,\beta$-unsaturated hydrophobic compound (a2). It has been found that since the copolymer A has a hydrophilic site (the unit derived from the compound (a1)) and a hydrophobic site (the unit derived from the compound (a2)) in its structure, the copolymer A can form an aggregate like a micelle, in which the hydrophobic site and the hydrophilic site are oriented inside and outside, respectively, in water. The point of the present invention resides in that the compound (a1) represented by the general formula (1) is used as a compound which becomes the hydrophilic site of this compound A. Since the polymer particle described in Japanese Patent Application Laid-Open No. 2011-026553 and Japanese Patent Application Laid-Open No. 2011-011449 has an ionic hydrophilic group, the dispersion stability of the polymer particle is high. However, the water resistance of a resulting image was low by the presence of the ionic hydrophilic group as described above. Such a conventional polymer particle has resided in the relationship of a trade-off between the dispersion stability of the polymer particle and the water resistance of the image. However, the compound (a1) represented by the general formula (1) can achieve both of the dispersion stability of the polymer particle and the water resistance of the image because the compound has a hydrophilic group having no ionicity. That is, both of the ejection stability of the ink and the water resistance of the image can be achieved by using the compound (a1) represented by the general formula (1).

According to a further investigation by the present inventors, it has been found that a proportion of the unit derived from the compound (a1) and a proportion of the unit derived from the compound (a2) are required to satisfy specific conditions. Specifically, it is necessary that the proportion of the unit derived from the compound (a1) to the copolymer A is 50% by mass or more and 90% by mass or less based on the total mass of the copolymer A, the proportion of the unit derived from the compound (a2) to the copolymer A is 10% by mass or more and 50% by mass or less based on the total mass of the copolymer A. When the proportions of these units do not fall within the respective ranges, a balance between the hydrophilicity and the hydrophobicity in the copolymer A is destroyed, and such a copolymer is hard to act like an emulsifier, so that a part thereof remains in the ink without contributing to the polymerization. As a result, the ejection stability of the ink has been lowered. Incidentally, it has been confirmed by the investigation by the present inventors that the above-described aggregate is formed even when the copolymer A is either a block copolymer or a random copolymer so far as the proportions of the units satisfy the respective ranges.

When the $\alpha,\beta$-unsaturated hydrophobic compound (b) high in compatibility with the copolymer A is further added into a solution in which the aggregate of the copolymer A is present, the $\alpha,\beta$-unsaturated hydrophobic compound (b) is incorporated in a high hydrophobic site inside the aggregate of the copolymer A. This hydrophobic compound is polymerized, whereby a polymer particle can be obtained. The reason why it is necessary to use the $\alpha,\beta$-unsaturated compound (b) as the hydrophobic compound in the present invention is as follows. The $\alpha,\beta$-unsaturated hydrophobic compound is similar to the structure of the hydrophobic site (the unit derived from the compound (a2)) of the copolymer A and thus very high in the compatibility with the copolymer A. Therefore, such a compound is easily incorporated in the high hydrophobic site inside the copolymer A, whereby the polymer particle can be stably formed upon the polymerization. In addition, an interaction between the polymer of the $\alpha,\beta$-unsaturated hydrophobic compound (b) and the copolymer A becomes very strong in the resulting polymer particle, so that the copolymer A is hard to be separated from the polymer particle. On the other hand, when a compound different from the $\alpha,\beta$-unsaturated hydrophobic compound (b), for example, a compound high in hydrophilicity to some extent, is used, it is hard to stably synthesize the polymer particle, and the copolymer A is easy to be separated if synthesized, so that a polymer particle high in defoaming properties is not obtained.

According to the synthesis process described above, a polymer particle which is a polymer particle having a core portion and a shell portion toward the outside from the inside thereof and in which the shell portion contains the copolymer A having the unit derived from the compound (a1) represented by the general formula (1) and the unit derived from the $\alpha,\beta$-unsaturated hydrophobic compound (a2), and the core portion contains the polymer of the $\alpha,\beta$-unsaturated hydrophobic compound (b), is obtained.

The present inventors have further investigated a reason why a characteristic effect of the present invention is achieved by the resultant polymer particle. As a result, it has been found that the effect is influenced by the form of the polymer particle. Specifically, the polymer particle synthesized under the specific conditions described above becomes a form having a spherical core portion and a branched shell portion extending toward the outside (in a solvent) from the interior of the core portion. In the present invention, the copolymer A becomes the shell portion, and the polymer of the α,β-unsaturated hydrophobic compound (b) becomes the core portion. By taking such a form, very high water resistance can be developed by the core portion high in hydrophobicity when the polymer particle is used in the ink while sufficiently retaining the dispersion stability in the ink by the shell portion high in hydrophilicity.

Ink Jet Ink:

In the present invention, the ink jet in according to the present invention contains a coloring material and a polymer particle.

Resin Particle:

In the present invention, "polymer particle" means a polymer present in a state of being dispersed in a solvent to have a particle size. The 50% cumulative volume average particle size ($D_{50}$) of the polymer particle is favorably 30 nm or more and 500 nm or less. Incidentally, the $D_{50}$ of polymer particles in Examples is measured by the following method. A polymer particle dispersion was diluted 50 times (by volume) with pure water and the measurement was conducted using UPA-EX150 (manufactured by NIKKISO) under the following measuring conditions: SetZero: 30 s, number of measurements: 3 times, measuring time: 180 seconds and refractive index: 1.5.

In the present invention, the content (% by mass) of the polymer particle in the ink is favorably from 0.1% by mass or more and 20.0% by mass or less based on the total mass of the ink. If the content is less than 0.1% by mass, the effect to improve the water resistance of the resulting image may not be sufficiently achieved in some cases. If the content is more than 20.0% by mass on the other hand, the effect to improve the ejection stability of the resulting ink may not be sufficiently achieved in some cases.

As described above, the polymer particle used in the ink according to the present invention has the spherical core portion and the branched shell portion. In the present invention, it is difficult to directly measure the proportion of the shell portion on the surface of the polymer particle, so that the proportion of the shell portion is indirectly determined by measuring a surface functional group density of the polymer particle subjected to a specific treatment. The specific treatment and the measuring method of the surface functional group density are as follows.

An aqueous dispersion in which the content of the polymer particle is 20% by mass was prepared. Five grams of this aqueous dispersion were taken out, 0.3 g of potassium persulfate is added, and the resulting mixture was stirred for 15 minutes at 100 rpm by a magnetic stirrer. This mixture was further subjected to a heating treatment for 7 hours at 80° C. Only the shell portion of the polymer particle can be oxidized by this specific treatment. In addition, the surface functional group density of the polymer particle was calculated by a reverse titration method shown below. First, the polymer particle after the oxidation was adjusted to pH 2.0 with an aqueous solution of hydrochloric acid and then centrifuged for 30 minutes at 10,000 rpm, the resultant solids of the polymer particle were dried for 24 hours at ordinary temperature. After the drying, 1 g of the polymer particle was taken out, 30 g of a 0.1 mol/L aqueous solution of sodium hydrogencarbonate was added, the resultant mixture was stirred for 15 minutes, centrifugation was conducted for 60 minutes at 25° C. and 80,000 rpm, and 15 g of a supernatant liquid was then taken out. Water was added to this supernatant liquid to dilute the solution in such a manner that the total weight becomes 200 g, and titration was then conducted with a 0.1 mol/L aqueous solution of hydrochloric acid. The amount (mol) of a surface functional group per gram of the polymer particle was calculated to obtain the surface charge density (mol/g) of the polymer particle. In the present invention, the surface functional group density calculated by this method is favorably 10 μmol/g or more and 320 μmol/g or less, more favorably 50 μmol/g or more and 200 μmol/g or less. The compounds constituting the polymer particle will hereinafter be respectively described.

(1) Copolymer A

The copolymer A has a unit derived from the compound (a1) represented by the general formula (1) and a unit derived from the α,β-unsaturated hydrophobic compound (a2). In the present invention, a proportion of the copolymer A to the polymer particle is favorably 10.0% by mass or more and 50.0% by mass or less based on the total mass of the polymer particle.

The copolymer A favorably has a weight average molecular weight of 3,000 or more and 200,000 or less in terms of polystyrene obtained by gel permeation chromatography (GPC). As described above, the copolymer A becomes the shell portion of the polymer particle and has an action of stabilizing the dispersion state of the polymer particle. Therefore, if the molecular weight is less than 3,000, the resulting polymer particle cannot be stably dispersed in water, and so the effect to improve the ejection stability of the ink may not be sufficiently achieved in some cases. If the molecular weight is more than 200,000, the resulting polymer particle is excellent in dispersion stability, but the particle size of the polymer particle become large, so that a viscosity of the resulting ink is increased, and so the effect to improve the ejection stability of the ink may not be sufficiently achieved in some cases.

The copolymer A favorably has a moderate solubility for water and a moderate solubility for the compound (b). This reason is that since the copolymer A acts like an emulsifier in the polymerization process of the polymer particle as described above, and so it is hard to form the aggregate of the copolymer A if the solubility in water is too high. In addition, if the solubility in the compound (b) is too low, it is hard to incorporate the compound (b) in the high hydrophobic site inside the aggregate of the copolymer A. In any case, the polymerization may not be stably conducted in some cases. Thus, an investigation by the present inventors has revealed that the solubility of the copolymer A at 25° C. is favorably 1 g or less in 100 g of water. It has also been found that the solubility of the copolymer A at 25° C. is favorably 1 g or more in 100 g of the compound (b). The compounds constituting the copolymer A will hereinafter be respectively described.

Compound (a1) Represented by the General Formula (1)

In the general formula (1): $R_1—(C_2H_4O)_n—R_2$, $R_1$ is at least one selected from a vinyl group ($CH_2=CH—$), an allyl group ($CH_2=CH—CH_2—$), an acryloyl group ($CH_2=CHCOO—$) and a methacryloyl group ($CH_2=C(CH_3)COO—$), and $R_2$ is a hydrogen atom or an alkyl group. $R_2$ is favorably a hydrogen atom, a methyl group or an ethyl group. n is 30 or more and 100 or less. If n is less than 30, a polyethylene glycol structure that is a hydrophilic site of the compound (a1) becomes short, so that the resulting polymer particle cannot be stably dispersed in water to lower the ejection stability of the resulting ink. If n is more than 100 on the other hand, the polyethylene glycol structure that is the hydrophilic site of the compound (a1) becomes long, so that the dispersion stability of the resulting polymer particle becomes excellent. However, the particle size of the polymer particle becomes large, so that the viscosity of the resulting ink is easily increased, and the ejection stability of the ink is lowered.

In the present invention, specific examples of the compound (a1) represented by the general formula (1) include methoxypolyethylene glycol(meth)acrylate, ethoxypolyethylene glycol(meth)acrylate and polyethylene glycol(meth)

acrylate. These compounds may be used either singly or in any combination thereof as needed. Among these, polyethylene glycol(meth)acrylate and methoxypolyethylene glycol (meth)acrylate are favorably used.

α,β-Unsaturated Hydrophobic Compound (a2)

In the present invention, "a43-unsaturated hydrophobic compound" means that such a compound is an α,β-unsaturated compound and a hydrophobic compound. In the present invention, "α,β-unsaturated compound" means a compound having an unsaturated bond (for example, C=C) between carbon of an α position and carbon of a β position. In the present invention, "hydrophobic compound" means a compound having no hydrophilic group (for example, a acidic group, basic group, hydroxyl group or alkylene oxide group). In the present invention, specific examples of the α,β-unsaturated hydrophobic compound include aromatic vinyl compounds such as styrene and α-methylstyrene; alkyl(meth)acrylates such as methyl(meth)acrylate, n-butyl(meth)acrylate, tert-butyl(meth)acrylate, 2-ethylhexyl(meth)acrylate and cyclohexyl(meth)acrylate; and (meth)acrylonitrile, vinyl acetate, alkyl vinyl ethers, vinylimidazole and ethylene. These compounds may be used either singly or in any combination thereof as needed. Among these α,β-unsaturated hydrophobic compounds, at least one selected from the aromatic vinyl compounds and the alkyl(meth)acrylates is favorable. At least one selected from styrene, stearyl (meth)acrylate and lauryl(meth)acrylate is more favorable.

Other Compound

In the present invention, the copolymer A may contain a further unit derived from "other compound" in addition to such unit derived from the compound represented by the general formula (1) and unit derived from the α,β-unsaturated hydrophobic compound (a2) as mentioned above within the limits not impeding the effect of the present invention. In such a case, a proportion of the unit derived from "other compound" is favorably 0% by mass or more and 40% by mass or less, more favorably 0% by mass or more and 20% by mass or less, based on the total mass of the copolymer A. The unit derived from "other compound" is particularly favorably substantially not contained. In the present invention, any of compounds having a polymerizable double bond may be used as "other compound". Specific examples of the other compound include unsaturated carboxylic acids such as (meth)acrylic acid, maleic acid, itaconic acid and fumaric acid, and derivatives and salts thereof; hydroxy alkyl(meth)acrylates such as hydroxymethyl(meth)acrylate, hydroxyethyl(meth)acrylate and hydroxypropyl(meth)acrylate; alkyl(meth)acrylamide compounds such as (meth)acrylamide, dimethyl(meth)acrylamide, N,N-dimethylethyl(meth)acrylamide, N,N-dimethylpropyl(meth)acrylamide, isopropyl(meth)acrylamide, diethyl(meth)acrylamide and (meth)acryloylmorpholine; and nitrogen-containing vinyl compounds such as N-vinylacetamide, N-vinylformamide, N-vinylpyridine, N-vinyl-pyrrolidone and N-vinylcarbazole. These compounds may be used either singly or in any combination thereof as needed.

(2) α,β-Unsaturated Hydrophobic Compound (b)

The same compound as the α,β-unsaturated hydrophobic compound mentioned above as the usable compound in the description of the compound (a2) may be used as the compound (b). Among the α,β-unsaturated hydrophobic compounds, at least one selected from the aromatic vinyl compounds and the alkyl(meth)acrylates is favorable. At least one selected from styrene, stearyl(meth)acrylate and lauryl(meth)acrylate is more favorable. A compound of the same kind as the α,β-unsaturated hydrophobic compound (a2) is particularly favorably used. The reason for this is that since compounds of the same kind are very high in compatibility with each other, the compound (b) is easily incorporated in the high hydrophobic site inside the copolymer A, and so the polymer particle can be stably formed. In addition, since the interaction between the shell portion and the core portion in the resulting polymer particle becomes very strong, the copolymer A becomes hard to be separated from the polymer particle. Incidentally, upon analysis of the resultant polymer particle, the α,β-unsaturated hydrophobic compound (a2) in the copolymer A can be distinguished from the α,β-unsaturated hydrophobic compound (b). This method will be described in "Analytic method of polymer particle" shown below.

In the present invention, a proportion (% by mass) of the unit derived from the compound (b) to the polymer particle is favorably 50.0% by mass or more and 90.0% by mass or less based on the total mass of the polymer particle, and a proportion (% by mass) of the copolymer A in the polymer particle is favorably 0.11 times or more and 0.43 times or less as much as the proportion of the unit derived from the compound (b). If the proportion is less than 0.11 times, the amount of the copolymer A contributing to the dispersion of the polymer particle is too less, so that the effect to improve the ejection stability of the resulting ink may not be sufficiently achieved in some cases. If the proportion is more than 0.43 times, the amount of the unit derived from the compound (b) contributing to the water resistance of the resulting image is too less, so that the effect to improve the water resistance of the ink may not be sufficiently achieved in some cases.

(3) Other Compound

In the present invention, the polymer particle may further contain a still further unit derived from "other compound" in addition to such unit derived from the compound represented by the general formula (1), unit derived from the α,β-unsaturated hydrophobic compound (a2) and unit derived from the α,β-unsaturated hydrophobic compound (b) as mentioned above within the limits not impeding the effect of the present invention. The same compound as the other compound mentioned above as the usable compound in the description of the copolymer A may be used as "other compound". In the present invention, a proportion of the unit derived from "other compound" to the polymer particle is favorably 0% by mass or more and 40% by mass or less, more favorably 0% by mass or more and 20% by mass or less, based on the total mass of the polymer particle. The unit derived from "the other compound" is particularly favorably substantially not contained.

Synthesis Process of Polymer Particle Dispersion:

Synthesis Process of Copolymer A

In the present invention, the copolymer A is obtained by copolymerizing the compound (a1) represented by the general formula (1) and the α,β-unsaturated hydrophobic compound (a2). Any process heretofore generally used may be used as a synthesis process of the copolymer A. Specific examples thereof include a radical polymerization process, an anionic polymerization process, a living radical polymerization process and a living anionic polymerization process. Upon the polymerization, a polymerization initiator and a chain-transfer agent may also be used. Any of polymerization initiators and chain-transfer agents heretofore generally used may be used.

Synthetic Process of Polymer Particle

In the present invention, the polymer particle is obtained by further polymerizing the α,β-unsaturated hydrophobic compound (b) in the presence of the copolymer A. Specifically, the polymer particle is obtained by a synthesis process having at least two steps of a dispersion step of dispersing the α,β-unsaturated hydrophobic compound (b) with the copolymer A and a polymerization step of polymerizing the α,β-unsaturated hydrophobic compound (b) dispersed with the copolymer A. The step of dispersing the compound (b) with the copolymer A is a step of mixing and stirring the copolymer A obtained above and the compound (b) to disperse the compound (b). Since the particle size of the polymer particle finally obtained is determined according to this step, a stirring method and stirring conditions are favorably adjusted according to a desired particle size. An ultrasonic dispersing device is favorably used as the stirring method. In that case, the frequency of an ultrasonic wave is favorably controlled to kHz or more and 850 kHz or less, and the application time is favorably controlled to 1 minute or more and 60 minutes or less. The compound (b) dispersed in this manner is polymerized to obtain the polymer particle. Upon the polymerization, a polymerization initiator may also be used. Any of those heretofore generally used may be used as the polymerization initiator.

Analysis Method of Polymer Particle:

With respect to the composition and molecular weight of the resultant polymer particle, an analysis may be performed according to a conventionally known method. Even from a polymer particle dispersion or ink containing the polymer particle, an analysis may be performed by centrifuging the polymer particle dispersion or ink and examining a precipitate and a supernatant liquid thereof. Incidentally, the analysis may be conducted even in the state of the polymer particle dispersion or ink. However, the analysis can be performed with higher precision by separating the polymer particle. As a specific method thereof, the polymer particle dispersion or ink is centrifuged for 30 minutes at 10,000 rpm, and the polymer particle can be obtained from a supernatant liquid thereof.

A sample obtained by dissolving the polymer particle obtained in this manner in an organic solvent such as tetrahydrofuran (THF) can be separated into a shell portion and a core portion using GPC equipped with a differential refractive index detector. In this case, the kind of an organic solvent used as an eluent, and the kind and number of columns used in the separation are suitably changed, whereby a polymer of the core portion and a polymer of the shell portion in the polymer particle, said polymers being different from each other in molecular weight and composition, can be separated from each other. That is, after the eluent that has passed through the detector is taken out, respective components are dried to solids, whereby the polymer of the core portion and the polymer of the shell portion are obtained in a state of being separated from each other. In addition, the kinds and contents of compounds respectively constituting the polymers separated can be determined by pyrolysis gas chromatography/mass-spectrometer (GC/MS), nuclear magnetic resonance analysis ($^{13}$C-NMR) and/or Fourier transform infrared spectrophotometer (FT-IR). That is, whether the shell portion has the unit derived from the compound (a1) represented by the general formula (1) and/or the unit derived from the $\alpha,\beta$-unsaturated hydrophobic compound (a2), the proportions of the respective units to the copolymer A or whether the core portion has the unit derived from the $\alpha,\beta$-unsaturated hydrophobic compound (b) can be verified.

The weight average molecular weight and number average molecular weight of the polymers separated are obtained by GPC measurement. The procedure of the GPC measurement in the present invention is as follows. A sample for the GPC measurement is obtained by placing each polymer separated by the above-described method in THF, leaving the polymer at rest for several hours to dissolve the polymer, and then filtering the resultant solution through a solvent-resistant membrane filter (trade name: TITAN2 Syringe Filter PTFE; Product of SUN-Sri) having a pour size of 0.45 µm. At this time, the content of the polymer particle in the sample is controlled to 0.1% by mass or more and 0.5% by mass or less. The resultant sample is used to conduct the measurement under the following conditions.

Apparatus: Alliance GPC 2695 (manufactured by Waters Co.)
Column: four sequential columns of Shodex KF-806M (product of SHOWA DENKO K.K.)
Mobile phase: THF (analytical grade)
Flow rate: 1.0 mL/min
Oven temperature: 40.0° C.
Amount of sample solution injected: 0.1 mL
Detector: RI (refractive index)
Polystyrene standard sample: PS-1 and PS-2 (products of Polymer Laboratories Co.) (17 molecular weights: 7,500,000, 2,560,000, 841,700, 377,400, 320,000, 210,500, 148,000, 96,000, 59,500, 50,400, 28,500, 20,650, 10,850, 5,460, 2,930, 1,300 and 580).

The measurement was conducted under the above-described conditions also in Examples which will be described subsequently.

Coloring Material:

The coloring material used in the ink according to the present invention includes a pigment and a dye. Any of those conventionally known may be used as the pigment and dye. In the present invention, the pigment is favorably used from the viewpoint of the water resistance of the resulting image. The content (% by mass) of the coloring material is controlled to favorably 0.1% by mass or more and 15.0% by mass or less, more favorably 1.0% by mass or more and 10.0% by mass or less, based on the total mass of the ink. In addition, the content (% by mass) of the coloring material in the ink is favorably 0.1 times or more and 2.0 times or less, more favorably 0.1 times or more and 1.5 times or less, in terms of mass ratio with respect to the content (% by mass) of the polymer particle. If the content is less than 0.1 times, a sufficient optical density may not be achieved in the resulting image in some cases. If the content is more hand 1.5 times, the amount of the coloring material becomes larger as compared with the amount of the polymer pigment, so that the effect to improve the water resistance of the resulting image may not be sufficiently achieved in some cases.

When the pigment is used as the coloring material in the present invention, examples of such a pigment include polymer-dispersed type pigments using a polymer as a dispersant (a polymer-dispersed pigment using a polymer dispersant, a microcapsule pigment with a surface of a pigment particle thereof covered with a polymer, and a polymer-bonded pigment with a polymer-containing organic group chemically bonded to a surface of a pigment particle thereof), and self-dispersion type pigments (self-dispersible pigments) with a hydrophilic group introduced into a surface of a pigment particle thereof. Quite naturally, pigments different in dispersing method may also be used in combination. Specifically, carbon black or an organic pigment is favorably used as the pigment. Only one kind of pigment may be used, or two or more kinds of pigment may be used in combination. When the pigment used in the ink is the polymer-dispersion type pigment, a polymer is used as a dispersant. The polymer used as the dispersant favorably has both hydrophilic site and hydrophobic site. Specific example thereof include acrylic polymers obtained by polymerizing a monomer having a carboxyl group, such as acrylic acid or methacrylic acid; and urethane polymers obtained by polymerizing a diol having an anionic group, such as dimethylol propionic acid. The acid value of the polymer used as the dispersant is favorably 50 mg KOH/g or more and 300 mg KOH/g or less. The weight average molecular weight (Mw), in terms of polystyrene, of the polymer used as the dispersant as determined by GPC is favorably 1,000 or more and 15,000 or less. The content (% by mass) of the polymer dispersant in the ink is favorably 0.1% by mass or more and 10.0% by mass or less, more favorably 0.2% by mass or more and 4.0% by mass or less, based on the total mass of the ink. In addition, the content (% by mass) of the polymer dispersant is favorably 0.1 time or more and 1.0 time or less in terms of mass ratio with respect to the content (% by mass) of the pigment.

Aqueous Medium:

The ink according to the present invention may use an aqueous medium that is water or a mixed solvent of water and a water-soluble organic solvent. The content (% by mass) of the water-soluble organic solvent in the ink is favorably 3.0% by mass or more and 50.0% by mass or less based on the total mass of the ink. As the water-soluble organic solvent, may be used any of water-soluble organic solvents heretofore generally used. Examples thereof include alcohols, glycols, alkylene glycols the alkylene group of which has 2 to 6 carbon atoms, polyethylene glycols, nitrogen-containing compounds, and sulfur-containing compounds. These water-soluble organic solvents may be used either singly or in any combination thereof as needed. Deionized water (ion-exchanged water) is favorably used as water. The content (% by mass) of water in the ink is favorably 50.0% by mass or more and 95.0% by mass or less based on the total mass of the ink.

Other Components:

The ink according to the present invention may contain a water-soluble organic compound that is solid at ordinary temperature, such as a polyhydric alcohol such as trimethylolpropane or trimethylolethane, urea, or a urea derivative such as ethyleneurea in addition to the above-described components, as needed. Further, the ink according to the present invention may contain various additives such as a surfactant, a pH adjustor, a rust preventive, a preservative, a mildew-proofing agent, an antioxidant, an anti-reducing agent, an evaporation accelerator, a chelating agent and a polymer as needed.

Ink Cartridge:

The ink cartridge according to the present invention is provided with an ink storage portion storing an ink, and the above-described ink according to the present invention is stored in the ink storage portion. The structure of the ink cartridge is such that the ink storage portion is formed by an ink storage chamber storing a liquid ink and a negative pressure generating member storage chamber storing a negative pressure generating member holding the ink in the interior thereof by a negative pressure. The ink storage portion of the ink cartridge may also be so constructed that the whole amount of the ink stored is held in the negative pressure generating member without providing the ink storage chamber storing the liquid ink. In addition, the ink cartridge may be constructed so as to have an ink storage portion and a recording head.

Ink Jet Recording Method:

The ink jet recording method according to the present invention is an ink jet recording method having a step of ejecting an ink from a recording head of an ink jet system to conduct recording on a recording medium, in which the above-described ink according to the present invention is used in the recording step. In the present invention, an ink jet recording method of such a system that thermal energy is applied to an ink to eject the ink from an ejection orifice of the recording head is particularly favorable. Incidentally, "recording" in the present invention includes a mode of conducting recording on a recording medium having an ink receiving layer or a recording medium such as plain paper with the ink according to the present invention and a mode of conducting recording on a non-permeable recording medium such as glass, plastic or film with the ink according to the present invention.

The present invention will hereinafter be described in more detail by the following Examples and Comparative Examples. However, the present invention is not limited by the following examples unless going beyond the gist of the present invention. Incidentally, all designations of "part" or "parts" described in the following examples are based on mass unless expressly noted. Incidentally, abbreviations in the specification and the following Tables are as follows.

PEGMA: Polyethylene glycol methacrylate
MeOPEGMA: Methoxypolyethylene glycol methacrylate
PPGMA: Polypropylene glycol methacrylate
PPGEGMA: Poly(propylene glycol/ethylene glycol) methacrylate [Blenmer 70PEP-350B (product of NOF CORPORATION)
SMA: Stearyl methacrylate
LMA: Lauryl methacrylate
EMA: Ethyl methacrylate
AA: Acrylic acid
MAA Methacrylic acid
St: Styrene.

Synthesis of Polymer Particle:
Preparation of Polymer Particle Dispersions P1 to P23

Polymers S having their corresponding compositions and properties shown in Table 1 were provided.

TABLE 1

Composition and properties of Polymer S

| | Compound 1-1 | | | Compound 1-2 | | Compound 1-3 | | | Properties |
|---|---|---|---|---|---|---|---|---|---|
| Polymer S | Kind | n | Proportion[*1] (% by mass) | Kind | Proportion[*2] (% by mass) | Kind | Proportion[*3] (% by mass) | Form of polymer | Mw of Polymer S |
| S1 | PEGMA | 60 | 72.0 | SMA | 28.0 | — | — | Random copolymer | 140000 |
| S2 | MeOPEGMA | 40 | 80.0 | SMA | 20.0 | — | — | Random copolymer | 110000 |
| S3 | PEGMA | 60 | 69.0 | IMA | 31.0 | — | — | Random copolymer | 140000 |
| S4 | PEGMA | 60 | 71.0 | St | 29.0 | — | — | Random copolymer | 130000 |
| S5 | AA | — | 48.0 | SMA | 52.0 | — | — | Random copolymer | 90000 |
| S6 | PPGMA | — | 48.0 | SMA | 52.0 | — | — | Random copolymer | 90000 |
| S7 | PPGEGMA | — | 48.0 | SMA | 52.0 | — | — | Random copolymer | 90000 |
| S8 | PEGMA | 10 | 68.0 | SMA | 32.0 | — | — | Random copolymer | 100000 |
| S9 | PEGMA | 30 | 51.0 | SMA | 49.0 | — | — | Random copolymer | 120000 |
| S10 | PEGMA | 100 | 89.0 | SMA | 9.0 | — | — | Random copolymer | 160000 |
| S11 | PEGMA | 120 | 90.0 | SMA | 10.0 | — | — | Random copolymer | 160000 |
| S12 | PEGMA | 60 | 40.0 | SMA | 60.0 | — | — | Random copolymer | 100000 |

TABLE 1-continued

Composition and properties of Polymer S

| | Composition | | | | | | | Properties |
|---|---|---|---|---|---|---|---|---|
| | Compound 1-1 | | Compound 1-2 | | Compound 1-3 | | | |
| Polymer S | Kind | n | Proportion*1 (% by mass) | Kind | Proportion*2 (% by mass) | Kind | Proportion*3 (% by mass) | Form of polymer | Mw of Polymer S |
| S13 | PEGMA | 60 | 50.0 | SMA | 50.0 | — | — | Random copolymer | 120000 |
| S14 | PEGMA | 60 | 90.0 | SMA | 10.0 | — | — | Random copolymer | 120000 |
| S15 | PEGMA | 60 | 95.0 | SMA | 5.0 | — | — | Random copolymer | 160000 |
| S16 | PEGMA | 60 | 60.0 | SMA | 30.0 | MAA | 10.0 | Random copolymer | 110000 |
| S17 | PEGMA | 60 | 72.0 | SMA | 28.0 | — | — | Block copolymer | 80000 |

*1 Proportion of unit derived from Compound 1-1 to Polymer S;
*2 Proportion of unit derived from Compound 1-2 to Polymer S;
*3 Proportion of unit derived from Compound 1-3 to Polymer S.

Polymer S and Compound 2 were then mixed in respective amounts (parts) shown in Table 2, 0.5 part of 2,2-azobis-(2-methylbutyronitrile), which is a polymerization initiator, was added, and the resultant mixture was stirred for 15 minutes at 100 rpm by a magnetic stirrer to obtain a solution. This solution was then added dropwise to 300 parts of ion-exchanged water over 5 minutes while stirring at 100 rpm by a magnetic stirrer. After dispersion was conducted under conditions of 20 kHz and 60 minutes by means of an ultrasonic wave application machine S-150D Digital Sonifier (manufactured by Branson Co.), a polymerization reaction was conducted for 8 hours at 70° C. under a nitrogen atmosphere. The resultant reaction mixture was the filtered through Mini Sarto 17594K (product of Aartorius Co.) having a pore size of 5.0 µm to obtain a polymer particle dispersion with a content of the polymer particle of 25.0% by mass. With respect to the polymer particle contained in the resultant polymer particle dispersion, the 50% cumulative volume average particle size ($D_{50}$) of the polymer particle, and proportions of respective units derived from Compound 2 and Polymer S in the polymer particle were measured according to the methods described above. In addition, the surface functional group density of the polymer particle contained in the polymer particle dispersion was measured according to the method described above. At this time, the oxidation treatment of the shell portion was not conducted about Resin Particle Dispersion P5 containing a polymer particle having an acidic group. Results thus obtained are shown in Table 2.

TABLE 2

Composition and properties of polymer particle dispersion

| | Amount of raw material added | | | | Composition of polymer particle dispersion | | | Properties of polymer particle | |
|---|---|---|---|---|---|---|---|---|---|
| | Polymer s | | Compound 2 | | | | | Average | Surface functional |
| Resin particle dispersion | Kind | Amount added (parts) | Kind | Amount added (parts) | Polymer S Proportion*4 (% by mass) | Compound 2 Proportion*5 (% by mass) | Proportion*6 (times) | particle size $D_{50}$ (nm) | group density (µmol/g) |
| P1  | S1  | 20.0 | EMA | 81.0 | 20.0 | 80.0 | 0.25 | 230 | 40 |
| P2  | S2  | 30.0 | EMA | 71.0 | 30.0 | 72.0 | 0.42 | 130 | 150 |
| P3  | S3  | 10.0 | EMA | 91.0 | 10.0 | 90.0 | 0.11 | 210 | 40 |
| P4  | S4  | 20.0 | EMA | 81.0 | 20.0 | 80.0 | 0.25 | 250 | 40 |
| P5  | S5  | 10.0 | EMA | 91.0 | 10.0 | 90.0 | 0.11 | 100 | 300 |
| P6  | S6  | 20.0 | EMA | 81.0 | 20.0 | 80.0 | 0.25 | 240 | 40 |
| P7  | S7  | 20.0 | EMA | 81.0 | 20.0 | 80.0 | 0.25 | 250 | 40 |
| P8  | S8  | 30.0 | EMA | 71.0 | 30.0 | 70.0 | 0.43 | 200 | 50 |
| P9  | S9  | 20.0 | EMA | 81.0 | 20.0 | 80.0 | 0.25 | 210 | 50 |
| P10 | S10 | 10.0 | EMA | 91.0 | 10.0 | 90.0 | 0.11 | 290 | 10 |
| P11 | S11 | 30.0 | EMA | 71.0 | 30.0 | 70.0 | 0.43 | 190 | 60 |
| P12 | S12 | 20.0 | EMA | 81.0 | 20.0 | 80.0 | 0.25 | 210 | 30 |
| P13 | S13 | 10.0 | EMA | 91.0 | 10.0 | 90.0 | 0.11 | 270 | 10 |
| P14 | S14 | 30.0 | EMA | 71.0 | 30.0 | 70.0 | 0.43 | 150 | 130 |
| P15 | S15 | 20.0 | EMA | 81.0 | 20.0 | 80.0 | 0.25 | 240 | 20 |
| P16 | S16 | 10.0 | EMA | 91.0 | 10.0 | 91.0 | 0.11 | 170 | 110 |
| P17 | S17 | 20.0 | EMA | 81.0 | 20.0 | 80.0 | 0.25 | 200 | 60 |
| P18 | S1  | 10.0 | St  | 91.0 | 10.0 | 90.0 | 0.11 | 280 | 10 |
| P19 | S1  | 30.0 | SMA | 71.0 | 30.0 | 70.0 | 0.43 | 200 | 100 |
| P20 | S1  | 9.0  | EMA | 92.0 | 9.0  | 91.0 | 0.10 | 270 | 10 |
| P21 | S1  | 10.0 | EMA | 91.0 | 10.0 | 90.0 | 0.11 | 220 | 20 |

TABLE 2-continued

Composition and properties of polymer particle dispersion

| | | Amount of raw material added | | | Composition of polymer particle dispersion | | | Properties of polymer particle | |
|---|---|---|---|---|---|---|---|---|---|
| | | Polymer s | | Compound 2 | | | | Average | Surface functional |
| Resin particle dispersion | Kind | Amount added (parts) | Kind | Amount added (parts) | Polymer S Proportion*4 (% by mass) | Compound 2 Proportion*5 (% by mass) | Proportion*6 (times) | particle size D$_{50}$ (nm) | group density (μmol/g) |
| P22 | S1 | 30.0 | EMA | 71.0 | 30.0 | 70.0 | 0.43 | 200 | 60 |
| P23 | S1 | 50.0 | EMA | 51.0 | 50.0 | 50.0 | 0.50 | 190 | 100 |

*4 Proportion of unit derived from Polymer S to the polymer particle;
*5 Proportion of unit derived from Compound 2 to the polymer particle;
*6 Proportion of the unit derived from Polymer S/proportion of the unit derived from Compound 2.

Preparation of Polymer Particle Dispersion P24

A polymer particle dispersion P24 (content of a polymer particle: 25.0% by mass) was prepared by an emulsion polymerization process using a polymer surfactant, referring to the Synthetic process described in Example 1 of Japanese Patent Application Laid-Open No. H09-267034. MeOPEGMA (in the general formula (1), $R_1$ is a methacryloyl group, $R_2$ is a methyl group, and n is 40) and LMA were used as monomers. The proportion of the unit derived from MeOPEGMA and the proportion of the unit derived from LMA to the resultant polymer particle were 75.0% by mass and 25.0% by mass, respectively. The 50% cumulative volume average particle size ($D_{50}$) of the polymer particle was 200 nm.

Preparation of Pigment Dispersion:
Preparation of Pigment Dispersion A

A carbon black dispersion was prepared by using, as a polymer dispersant, a benzyl methacrylate-methacrylic acid copolymer having an acid value of 130 mg KOH/g and a weight average molecular weight of 7,000 and was referred to as Pigment Dispersion A. The content of the pigment in the resultant Pigment Dispersion A was 20.0% by mass, the content of the polymer was 5.0% by mass, and the volume average particle size of the pigment was 130 nm.

Preparation of Pigment Dispersion B

Cab-O-Jet 200 (product of Cabot), which is self-dispersible carbon black with a sulfophenyl group bonded to the surface of the carbon black, was used as Pigment Dispersion B (content of the pigment: 20.0% by mass). The volume average particle size of the pigment was 135 nm.

Preparation of Aqueous Dye Solution:

C.I. Direct Black 195 was used to prepare an aqueous dye solution in which the content of the dye was 20.0% by mass.

Preparation of Ink:

After the polymer particle dispersion and pigment dispersion or aqueous dye solution obtained above were used, and mixed according to their corresponding compositions shown in Table 3 and sufficiently stirred and dispersed, the respective mixtures were filtered under pressure through a microfilter (product of Fuji Photo Film Co., Ltd.) having a pore size of 3.0 μm to prepare respective inks.

TABLE 3

Composition and properties of ink

| #Ink | Pigment dispersion or aqueous dye solution*7 Kind | Content (% by mass) | Resin particle dispersion*8 Kind | Content (% by mass) | Glycerol (% by mass) | 2-Pyrrolidone (% by mass) | Polyethylene glycol*9 (% by mass) | Acetylenol E100*10 (% by mass) | Ion-exchanged water (% by mass) | Content of coloring material in ink (% by mass) | Content of polymer particle in ink (% by mass) | Content of coloring material/content of polymer particle in ink (times) |
|---|---|---|---|---|---|---|---|---|---|---|---|---|
| 1 | A | 13.3 | P1 | 64.0 | 5.0 | 5.0 | 5.0 | 1.0 | 6.7 | 2.7 | 16.0 | 0.2 |
| 2 | A | 13.3 | P2 | 64.0 | 5.0 | 5.0 | 5.0 | 1.0 | 6.7 | 2.7 | 16.0 | 0.2 |
| 3 | A | 13.3 | P3 | 64.0 | 5.0 | 5.0 | 5.0 | 1.0 | 6.7 | 2.7 | 16.0 | 0.2 |
| 4 | A | 13.3 | P4 | 64.0 | 5.0 | 5.0 | 5.0 | 1.0 | 6.7 | 2.7 | 16.0 | 0.2 |
| 5 | A | 13.3 | P5 | 64.0 | 5.0 | 5.0 | 5.0 | 1.0 | 6.7 | 2.7 | 16.0 | 0.2 |
| 6 | A | 13.3 | P6 | 64.0 | 5.0 | 5.0 | 5.0 | 1.0 | 6.7 | 2.7 | 16.0 | 0.2 |
| 7 | A | 13.3 | P7 | 64.0 | 5.0 | 5.0 | 5.0 | 1.0 | 6.7 | 2.7 | 16.0 | 0.2 |
| 8 | A | 13.3 | P8 | 64.0 | 5.0 | 5.0 | 5.0 | 1.0 | 6.7 | 2.7 | 16.0 | 0.2 |
| 9 | A | 13.3 | P9 | 64.0 | 5.0 | 5.0 | 5.0 | 1.0 | 6.7 | 2.7 | 16.0 | 0.2 |
| 10 | A | 13.3 | P10 | 64.0 | 5.0 | 5.0 | 5.0 | 1.0 | 6.7 | 2.7 | 16.0 | 0.2 |
| 11 | A | 13.3 | P11 | 64.0 | 5.0 | 5.0 | 5.0 | 1.0 | 6.7 | 2.7 | 16.0 | 0.2 |
| 12 | A | 13.3 | P12 | 64.0 | 5.0 | 5.0 | 5.0 | 1.0 | 6.7 | 2.7 | 16.0 | 0.2 |
| 13 | A | 13.3 | P13 | 64.0 | 5.0 | 5.0 | 5.0 | 1.0 | 6.7 | 2.7 | 16.0 | 0.2 |
| 14 | A | 13.3 | P14 | 64.0 | 5.0 | 5.0 | 5.0 | 1.0 | 6.7 | 2.7 | 16.0 | 0.2 |
| 15 | A | 13.3 | P15 | 64.0 | 5.0 | 5.0 | 5.0 | 1.0 | 6.7 | 2.7 | 16.0 | 0.2 |
| 16 | A | 13.3 | P16 | 64.0 | 5.0 | 5.0 | 5.0 | 1.0 | 6.7 | 2.7 | 16.0 | 0.2 |
| 17 | A | 13.3 | P17 | 64.0 | 5.0 | 5.0 | 5.0 | 1.0 | 6.7 | 2.7 | 16.0 | 0.2 |
| 18 | A | 13.3 | P18 | 64.0 | 5.0 | 5.0 | 5.0 | 1.0 | 6.7 | 2.7 | 16.0 | 0.2 |
| 19 | A | 13.3 | P19 | 64.0 | 5.0 | 5.0 | 5.0 | 1.0 | 6.7 | 2.7 | 16.0 | 0.2 |

TABLE 3-continued

Composition and properties of ink

| #Ink | Pigment dispersion or aqueous dye solution*7 Kind | Pigment dispersion or aqueous dye solution*7 Content (% by mass) | Resin particle dispersion*8 Kind | Resin particle dispersion*8 Content (% by mass) | Glycerol (% by mass) | 2-Pyrrolidone (% by mass) | Polyethylene glycol*9 (% by mass) | Acetylenol E100*10 (% by mass) | Ion-exchanged water (% by mass) | Content of coloring material in ink (% by mass) | Content of polymer particle in ink (% by mass) | Content of coloring material/ content of polymer particle in ink (times) |
|---|---|---|---|---|---|---|---|---|---|---|---|---|
| 20 | A | 13.3 | P20 | 64.0 | 5.0 | 5.0 | 5.0 | 1.0 | 6.7 | 2.7 | 16.0 | 0.2 |
| 21 | A | 13.3 | P21 | 64.0 | 5.0 | 5.0 | 5.0 | 1.0 | 6.7 | 2.7 | 16.0 | 0.2 |
| 22 | A | 13.3 | P22 | 64.0 | 5.0 | 5.0 | 5.0 | 1.0 | 6.7 | 2.7 | 16.0 | 0.2 |
| 23 | A | 13.3 | P23 | 64.0 | 5.0 | 5.0 | 5.0 | 1.0 | 6.7 | 2.7 | 16.0 | 0.2 |
| 24 | A | 13.3 | P24 | 64.0 | 5.0 | 5.0 | 5.0 | 1.0 | 6.7 | 2.7 | 16.0 | 0.2 |
| 25 | A | 22.0 | P1 | 12.0 | 5.0 | 5.0 | 5.0 | 1.0 | 50.0 | 4.4 | 3.0 | 1.5 |
| 26 | A | 23.0 | P1 | 11.5 | 5.0 | 5.0 | 5.0 | 1.0 | 49.5 | 4.6 | 2.9 | 1.6 |
| 27 | B | 13.3 | P1 | 64.0 | 5.0 | 5.0 | 5.0 | 1.0 | 6.7 | 2.7 | 16.0 | 0.2 |
| 28 | *11 | 13.3 | P1 | 64.0 | 5.0 | 5.0 | 5.0 | 1.0 | 6.7 | 2.7 | 16.0 | 0.2 |

*7The content of the coloring material was 20.0% by mass in each case.
*8The content of the polymer particle was 25.0% by mass.
*9Polyethylene glycol (number average molecular weight:1,000).
*10Acetylenol E100 (surfactant produced by Kawaken Fine Chemicals Co., Ltd.).
*11Aqueous dye solution.

Evaluation:

An ink cartridge charged with each of the inks obtained above was installed in an ink jet recording apparatus (trade name "PIXUS iP8600", manufactured by Canon Inc.). Recording conditions were as follows: temperature: 23° C., relative humidity: 55%, recording density: 2,400 dpi×1,200 dpi and ejection amount per droplet: 2.5 pL. In the examples, the conditions where using the above-described ink jet recording apparatus, 8 ink droplets each having a volume of 2.5 µL are applied to a unit region of 1/600 in×1/600 in with a resolution of 600 dpi×600 dpi are defined as an image of a recording duty of 100%. In the following evaluation criteria, "A" and "B" were regarded as an acceptable level, and "C" was regarded as an unacceptable level.

Ejection Stability of Ink:

The above-described ink jet recording apparatus was used to print a solid image (image of recording duty 100%) of 19 cm×26 cm on ten A4-sized PPC paper sheets (GF-500, product of Canon Inc.). At this time, the solid images printed on the fifth paper sheet and tenth paper sheet were visually observed, thereby evaluating the ejection stability of the ink. The evaluation criteria of the ejection stability of the ink are as follows.

Evaluation Results are Shown in Table 4.

A: Neither white stripes nor blur was observed in the solid images on the fifth and tenth paper sheets;
B: Neither white stripes nor blur was observed in the solid image on the fifth paper sheet, but white stripes and blur were slightly observed in the solid image on the tenth paper sheet, which was an almost inconspicuous level;
C: White stripes and blur were observed in the solid images on the fifth and tenth paper sheets.

Water Resistance of Image:

The above-described ink jet recording apparatus was used to print a solid image (image of recording duty 100%) of 19 cm×26 cm on an A4-sized PPC paper sheet (GF-500, product of Canon Inc.). One droplet of pure water was dropped on the resultant image. After 1 minute, a wiping paper towel, Kimwipe S-200 (trade name; product of CLECIA), was pressed against a region on which the pure water had been dropped from the above followed by being left to stand for 1 minute. Thereafter, the Kimwipe, which is paper-made waste, was softly separated in a direction perpendicular to the image. The conditions of the region of the image on which the pure water had been dropped and the Kimwipe were visually observed, thereby evaluating the water resistance of the image. The evaluation criteria of the water resistance of the image are as follows. Evaluation results are shown in Table 4.

A: No color change was observed in the image, and no adhesion of the ink to Kimwipe was observed;
B: No color change was observed in the image, but adhesion of the ink to Kimwipe was slightly observed;
C: Color change was observed in the image, and adhesion of the ink to Kimwipe was also observed.

TABLE 4

Evaluation results

| Example No. | Ink No. | Ejection stability of ink | Water resistance of image |
|---|---|---|---|
| Example 1 | Ink 1 | A | A |
| Example 2 | Ink 2 | A | A |
| Example 3 | Ink 3 | A | A |
| Example 4 | Ink 4 | A | A |
| Example 5 | Ink 9 | A | A |
| Example 6 | Ink 10 | A | A |
| Example 7 | Ink 13 | A | A |
| Example 8 | Ink 14 | A | A |
| Example 9 | Ink 16 | A | A |
| Example 10 | Ink 17 | A | A |
| Example 11 | Ink 18 | A | A |
| Example 12 | Ink 19 | A | A |
| Example 13 | Ink 20 | B | A |
| Example 14 | Ink 21 | A | A |
| Example 15 | Ink 22 | A | A |
| Example 16 | Ink 23 | A | B |
| Example 17 | Ink 25 | A | A |
| Example 18 | Ink 26 | A | B |
| Example 19 | Ink 27 | A | A |
| Example 20 | Ink 28 | A | B |
| Comp. Ex. 1 | Ink 5 | A | C |
| Comp. Ex. 2 | Ink 6 | C | A |
| Comp. Ex. 3 | Ink 7 | C | A |
| Comp. Ex. 4 | Ink 8 | C | A |
| Comp. Ex. 5 | Ink 11 | C | A |
| Comp. Ex. 6 | Ink 12 | C | A |
| Comp. Ex. 7 | Ink 15 | C | A |
| Comp. Ex. 8 | Ink 24 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264877, filed Dec. 2, 2011, which is hereby incorporated by reference herein in its entirety.

What is claimed is:

1. An ink jet ink comprising a coloring material and a polymer particle, wherein
the polymer particle has a core portion and a shell portion, the shell portion contains a copolymer A having a unit derived from a compound (a1) represented by a general formula (1) of $R_1-(C_2H_4O)_n-R_2$ where $R_1$ is at least one selected from a vinyl group, an allyl group, an acryloyl group and a methacryloyl group, $R_2$ is a hydrogen atom or an alkyl group, and n is 30 or more and 100 or less, and a unit derived from an α,β-unsaturated hydrophobic compound (a2),
a proportion of the unit derived from the compound (a1) to the copolymer A is 50% by mass or more and 90% by mass or less, and a proportion of the unit derived from the compound (a2) to the copolymer A is 10% by mass or more and 50% by mass or less, and
the core portion contains a polymer of an α,β-unsaturated hydrophobic compound (b).

2. The ink jet ink according to claim 1, wherein the polymer particle is obtained by further polymerizing the α,β-unsaturated hydrophobic compound (b) in the presence of the copolymer A.

3. The ink jet ink according to claim 1, wherein the polymer particle is obtained by a synthesis process including a dispersion step of dispersing the α,β-unsaturated hydrophobic compound (b) with the copolymer A and a polymerization step of polymerizing the α,β-unsaturated hydrophobic compound (b) dispersed with the copolymer A.

4. The ink jet ink according to claim 1, wherein a proportion (% by mass) of the copolymer A to the polymer particle is 0.11 times or more and 0.43 times or less as much as the proportion (% by mass) of the unit derived from the α,β-unsaturated hydrophobic compound (b).

5. The ink jet ink according to claim 1, wherein a content (% by mass) of the coloring material in the ink is 0.1 times or more and 1.5 times or less in terms of mass ratio with respect to the content (% by mass) of the polymer particle.

6. An ink cartridge comprising an ink storage portion storing an ink, wherein the ink stored in the ink storage portion is the ink jet ink according to claim 1.

7. A polymer particle used in an ink jet ink, wherein
the polymer particle has a core portion and a shell portion, the shell portion contains a copolymer A having a unit derived from a compound (a1) represented by a general formula (1) of $R_1-(C_2H_4O)_n-R_2$ where $R_1$ is at least one selected from a vinyl group, an allyl group, an acryloyl group and a methacryloyl group, $R_2$ is a hydrogen atom or an alkyl group, and n is 30 or more and 100 or less, and a unit derived from an α,β-unsaturated hydrophobic compound (a2),
a proportion of the unit derived from the compound (a1) to the copolymer A is 50% by mass or more and 90% by mass or less, and a proportion of the unit derived from the compound (a2) to the copolymer A is 10% by mass or more and 50% by mass or less, and
the core portion contains a polymer of an α,β-unsaturated hydrophobic compound (b).

8. The polymer particle according to claim 7, wherein the polymer particle is obtained by further polymerizing the α,β-unsaturated hydrophobic compound (b) in the presence of the copolymer A.

9. The polymer particle according to claim 7, wherein the polymer particle is obtained by a synthesis process including a dispersion step of dispersing the α,β-unsaturated hydrophobic compound (b) with the copolymer A and a polymerization step of polymerizing the α,β-unsaturated hydrophobic compound (b) dispersed with the copolymer A.

* * * * *